United States Patent [19]

Loeb et al.

[11] Patent Number: 5,551,016
[45] Date of Patent: Aug. 27, 1996

[54] MONITORING SYSTEM AND INTERFACE APPARATUS THEREFOR

[75] Inventors: Gerald E. Loeb, Kingston; Roy A. Young, Odessa; Kevin H. Hood, Kingston, all of Canada

[73] Assignee: Queen's University at Kingston, Kingston, Canada

[21] Appl. No.: 84,928

[22] Filed: Jul. 1, 1993

[51] Int. Cl.[6] .................................................. G06F 3/05
[52] U.S. Cl. ...................................................... 395/550
[58] Field of Search .......................... 395/550; 348/537; 364/556, 566, 569; 341/122, 123; 375/355

[56] References Cited

U.S. PATENT DOCUMENTS

| | | | |
|---|---|---|---|
| 3,900,721 | 8/1975 | Speiser et al. | 235/156 |
| 3,900,887 | 8/1975 | Soga et al. | |
| 4,053,708 | 10/1977 | Hotchkiss | 178/69.1 |
| 4,291,299 | 9/1981 | Hinz et al. | 340/347 AD |
| 4,416,015 | 11/1983 | Gitlin | 375/14 |
| 4,630,139 | 12/1986 | Dickens . | |
| 4,905,085 | 2/1990 | Faulhaber | 348/537 |
| 4,970,582 | 11/1990 | Scott . | |
| 5,027,208 | 6/1991 | Dwyer, Jr. et al. . | |
| 5,045,940 | 9/1991 | Peters et al. . | |
| 5,255,289 | 10/1993 | Tomita | 375/86 |

OTHER PUBLICATIONS

M. J. Bak and G. E. Loeb "A Pulsed Integrator for EMG Analysis" Electroencephalography and Clinical Neurophysiology, 1979, 47: 738–741.

Primary Examiner—Thomas M. Heckler
Attorney, Agent, or Firm—Richard J. Hicks

[57] ABSTRACT

In monitoring systems for acquiring data about a subject, such as are used, for example, in the medical, scientific and engineering fields, determination of temporal relationships between data acquired from multiple monitoring devices is facilitated by means of an interface unit which interconnects the monitoring devices with tape recorders for storing the data and a computer for processing the data. The interface unit generates various timing and control signals including a time code signal. The interface unit supplies the time code signal to the recording devices for recording simultaneously with the data. The time code signal may be a linear time code (LTC) derived from a video sync signal generated by the interface unit for synchronizing a camera. A sampling clock signal for controlling digitizing of the analog data acquired by the system is derived from the time code signal. The time code signal may comprise a common temporal reference signal, for example the SMPTE used with NTSC format video or its European equivalent EBU used with the PAL format. The video synchronization signal may itself be synchronized to and external timing signal, perhaps derived from one of the monitoring devices.

54 Claims, 7 Drawing Sheets

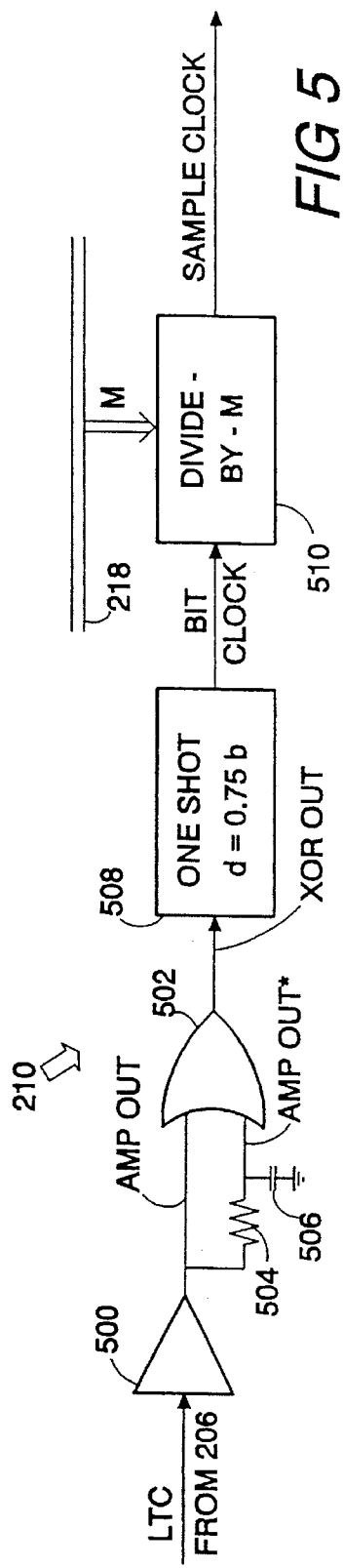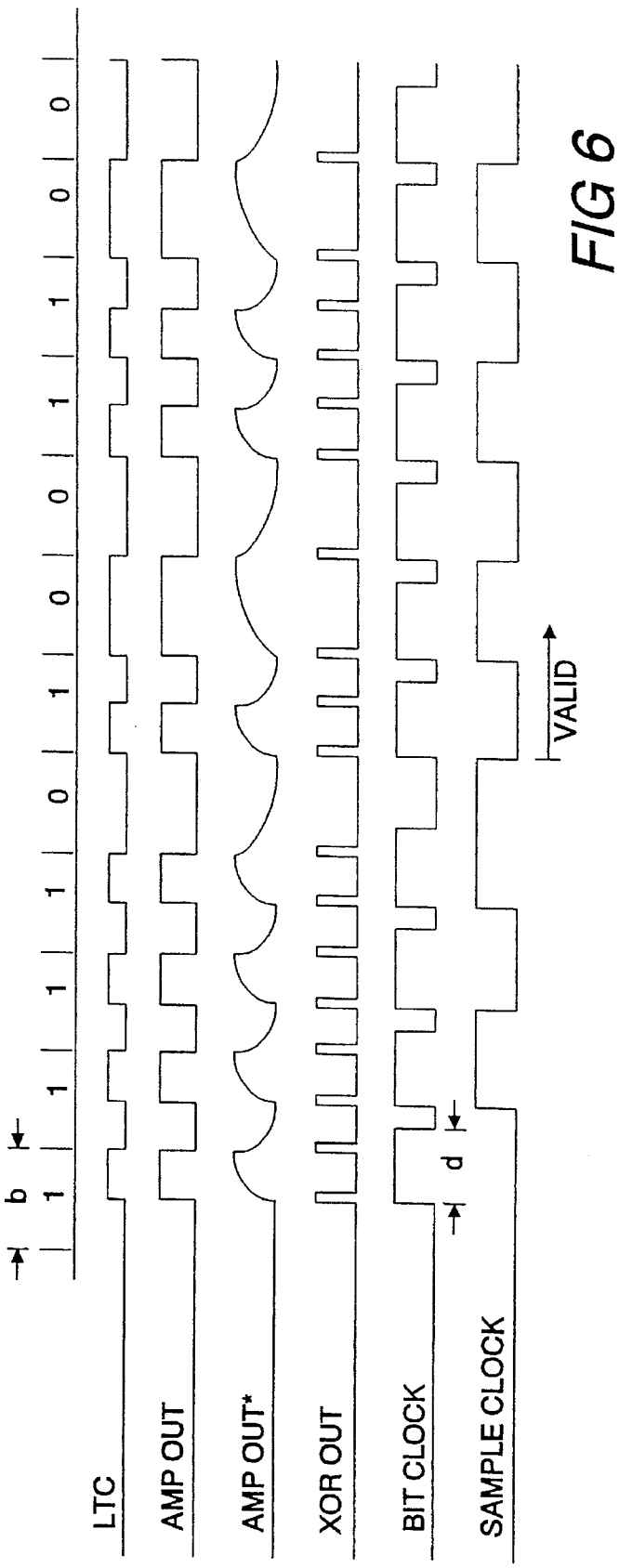

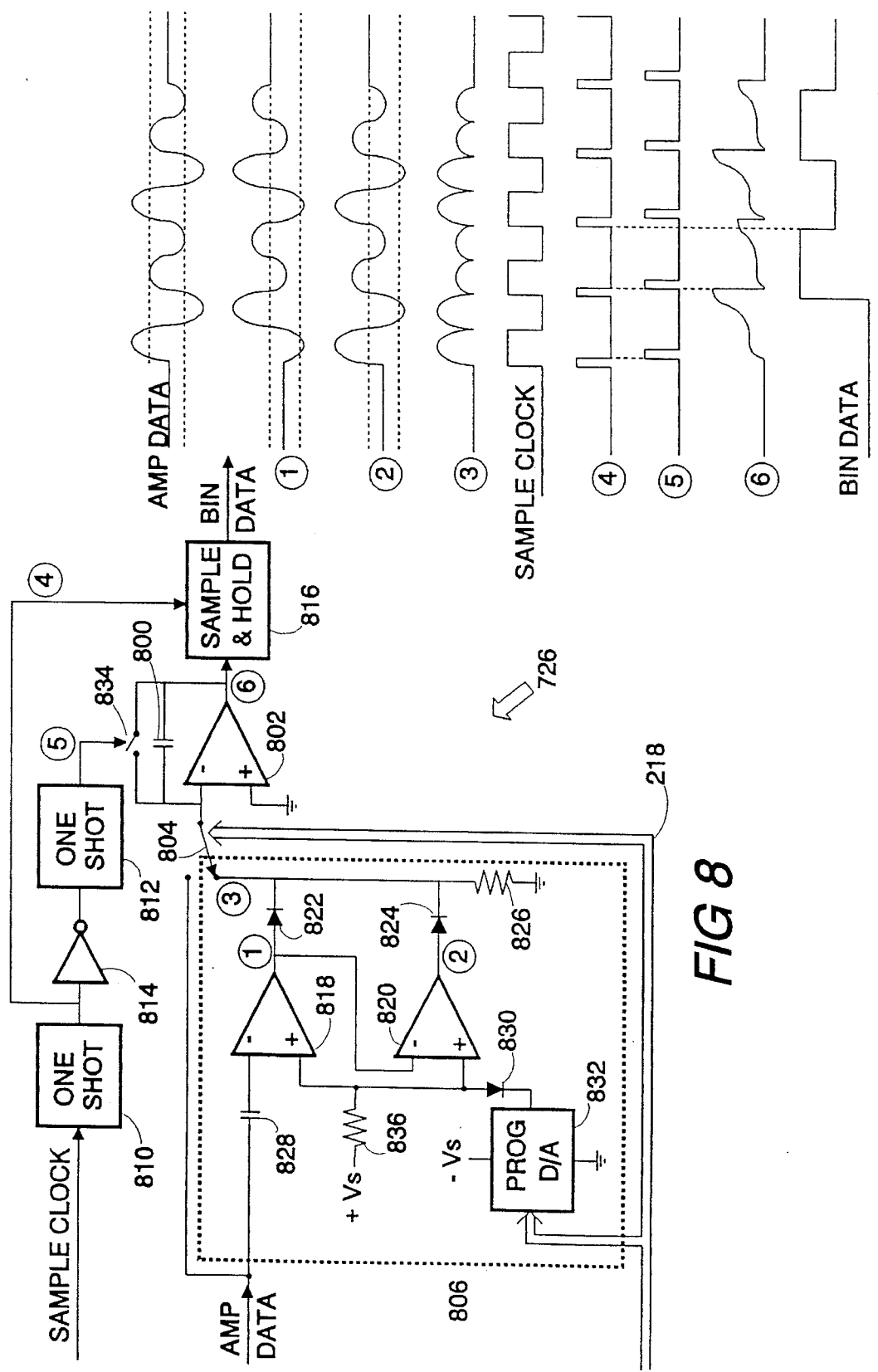

MONITORING SYSTEM AND INTERFACE APPARATUS THEREFOR

FIELD OF THE INVENTION

The invention relates to monitoring systems comprising a plurality of monitoring devices for acquiring data about a subject for subsequent processing and/or analysis, and also to interface apparatus for use in such monitoring systems.

BACKGROUND

There are many applications in, for example, medical, scientific and engineering fields, where data acquired from multiple sources must be correlated so as to facilitate the determination of, for example, temporal relationships between events recorded in the data from the different sources. It is common to digitize and record these data according to discrete sampling periods. Data from the various devices and other equipment might be recorded using video/audio tape recorders and other equipment. Each piece of equipment would be connected, if necessary by way of a suitable interface, to a host or control computer which would control the equipment to collect and record data about events occurring during an experiment or a predetermined study period. The data would then be analyzed to determine, for example, the subject's responses to certain events occurring during the experiment or study period.

Some of the events may occur at irregular intervals with respect to each other and the sampling period, while other events may occur periodically but asynchronously with respect to each other and the sampling period. For example, in kinesiology experiments, events may be generated by electronic devices such as stimulators which operate autonomously producing events which are asynchronous with respect to the frame rate of the video camera. This makes it difficult to study the time course of the response of the system because the input event may have occurred at any time during the course of the video frame to which it is ascribed.

Several of the devices may each have an inherent frame rate which must be preserved, but which may not be compatible with each other (e.g. video and motion analysis systems employing North American NTSC and European PAL video formats) or may not provide adequate temporal resolution for digitizing data acquired simultaneously from other sources. Other items of the equipment might have their own internal time base, or no time base at all. Some equipment might use footage meters, others elapsed time, and others count sampling intervals. To find a particular portion of data may involve searching for sync pulses like tone pips and light flashes, which is tedious and often not reliable. Consequently, with such an assemblage of equipment, problems arise during analysis of the data when trying to determine what temporal correlation, if any, exists between events recorded by different ones of the monitoring devices.

SUMMARY OF THE INVENTION

An object of the present invention is to overcome or at least mitigate the problem.

According to one aspect of the present invention there is provided a monitoring system comprising a plurality of monitoring devices for acquiring data about a subject, an analog-to-digital converter means responsive to a sampling clock signal for digitizing data acquired by the monitoring devices, and interface apparatus for interconnecting the monitoring devices and the analog-to-digital converter means, the interface apparatus comprising timing means for generating a time code signal, deriving the sampling clock signal from, and synchronized to, the time code signal, and supplying said sampling clock signal to the analog-to-digital converter means.

According to a second aspect of the invention, there is provided interface apparatus for use in a monitoring system comprising a plurality of monitoring devices for acquiring data about a subject and analog-to-digital converter means responsive to a sampling clock signal for digitizing data acquired by the monitoring devices, the interface apparatus comprising timing means for generating a time code signal and deriving the sampling clock signal from, and synchronized to, the time code signal.

In preferred embodiments of either aspect of the invention, the monitoring system comprises at least one recording device for recording the acquired data and the interface apparatus further comprises means for supplying the time code signal to said recording device for simultaneous recording with the corresponding data.

Where the recording device is a multi-channel tape recorder, the time code supplying means may supply the time code signal to one of the channels.

The monitoring apparatus may comprise a video input device, such as a camera, which is responsive to a video synchronization signal and the interface unit comprise a video synchronization signal generator. The means for providing the time code signal may then be arranged to synchronize the time code signal and the video signal.

Where the system includes such a video input device, and at least one of the recording devices is a video recorder, for example a video tape recorder, the interface apparatus may comprise means for combining the time code with a video signal from a video monitoring device and supplying the combined signal to the video recorder. The combining means may then combine the time code as a vertical interval time code (VITC).

The time code signal may comprise a common temporal reference signal, for example the SMPTE used with NTSC format video or its European equivalent EBU used with the PAL format.

The signal generation signal circuit may be operable to start generating the video sync signal in response to a trigger signal, perhaps generated by operation of a push-button by the user. In addition, in some applications, the signal generation circuit may be responsive to an external synchronization signal, perhaps derived from one of the monitoring devices.

The interface unit may comprise means for supplying an analog signal from one of the monitoring devices to bin integration means comprising an integrator means for integrating the analog signal, sample-and-hold means for repeatedly sampling and storing the output of the integrator means, means for resetting the integrator means after each sampling by the sample-and-hold device, and variable offset full wave rectifier means for rectifying the analog signal before its application to the integrator.

The interface unit may comprise means for generating a time code signal comprising temporal data encoded onto a bit clock, and means for extracting a sampling clock for the analog-to-digital converter means from the time code signal.

A remote control unit may be provided to allow the user to operate the interface apparatus from a remote location.

The remote control unit may comprise a video display, for example a liquid crystal display, and manual input devices such as keys and potentiometers, and be coupled to the interface apparatus by a link allowing transfer of video signals and data to the remote control unit and user-generated commands to the interface apparatus.

According to another aspect of the invention, apparatus for acquiring data from monitoring devices and conditioning the data for digitization by analog-to-digital converter means comprises means for supplying an analog signal from one of the monitoring devices to bin integration means comprising an integrator means for integrating the analog signal, sample-and-hold means for repeatedly sampling and storing the output of the integrator means, means for resetting the integrator means after each sampling by the sample-and-hold device, and variable offset full wave rectifier means for rectifying the analog signal before its application to the integrator.

Preferably, the apparatus further comprises means for selectively connecting the rectifier means in circuit with the integrator means.

According to another aspect of the invention, apparatus for acquiring data from monitoring devices and conditioning the data for digitization by analog-to-digital converter means comprises means for generating a time code signal comprising temporal data encoded onto a bit clock, and means for extracting a sampling clock for the analog-to-digital converter means from the time code signal.

BRIEF DESCRIPTION OF DRAWINGS

Various objects, features and advantages of the invention will become apparent from the following description of a preferred embodiment which will be described, by way of example only, with reference to the accompanying drawings, in which:

FIG. 5 is a schematic block diagram of a sample-clock extractor of the interface unit;

FIG. 6 is a timing diagram for the sample clock extractor;

FIG. 8 is a block schematic diagram of a bin integrator of the interface unit of FIG. 1;

FIG. 9 is a timing diagram related to conversion of a continuously changing analog input into bin data.

DESCRIPTION OF PREFERRED EMBODIMENT(S)

Figure 1:
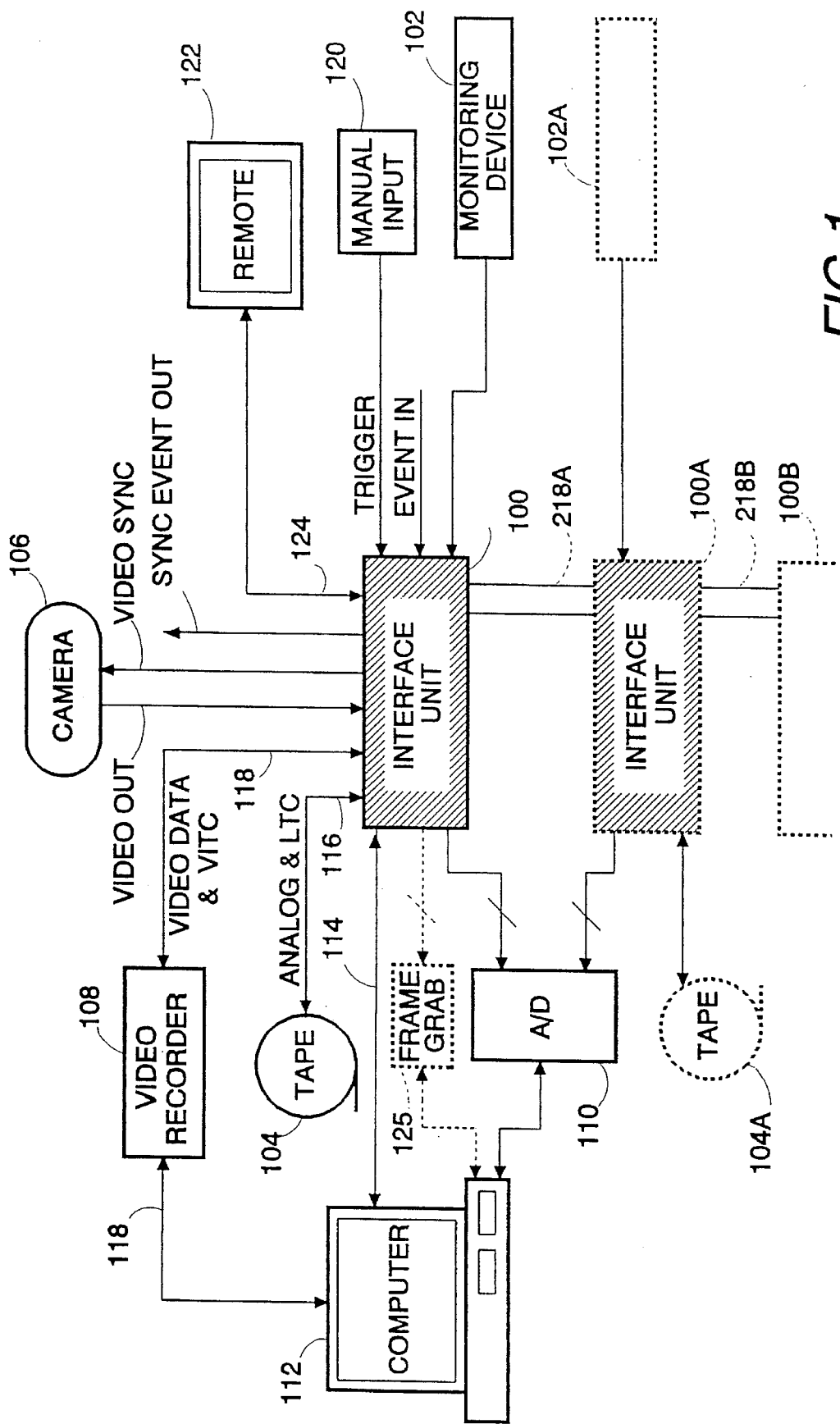
FIG. 1 is a block schematic diagram of a monitoring system for acquiring video and other analog data about a subject of interest, and including an interface unit embodying the present invention.

FIG. 1 illustrates an assemblage of apparatus which might typically be used in a kinesiology laboratory for acquiring data about a subject being monitored (not shown). The apparatus comprises an interface unit 100 to which are connected up to sixteen monitoring devices 102 (only one is shown), a tape recorder 104, at least one video camera 106, at least one video tape recorder 108, a real-time data acquisition card 110 (for example Data Transmission DT2821) which includes a 16 channel analog-to-digital (A-D) converter, and a computer 112. The real-time data acquisition card, which will be referred to, for convenience, as analog-to-digital converter 110, is shown separate from the computer 112 but is conveniently a card installed in the computer 112. A frame grabber 125, shown by dashed lines, may be installed as another card and access the video signal at a convenient point within the interface unit.

The computer 112 is connected to the interface and preprocessing unit 100 by way of an RS-232 interface 114 and also by way of the A/D converter 110. It also controls the tape recorder 104 and video tape recorder 108 via RS 232 links 116 and 118, respectively.

The monitoring devices 102 might monitor, for example, heart rate, respiration, brain activity, muscular activity (by EMG) and strain gauges, and supply corresponding analog output signals. The camera 106 may be a video camera or any other instrument suitable for recording visual information (VIDEO DATA) about the subject and capable of synchronization to an externally provided synchronization signal VIDEO SYNC. The video data and the analog data from the monitoring device 102 show the subject's responses relative to "events" for example stimuli, which may occur periodically or aperiodically with respect to each other and the video sync signal. The data will usually be recorded and analyzed later, but may also be analyzed on-line in real-time, e.g. for calibration purposes.

When the subject is being studied, acquisition of data is initiated by means of an input trigger signal TRIGGER applied to the interface unit 100 from a manual input device 120, for example a push-button/keypad. The TRIGGER signal indirectly prompts the computer 112 to start the tape recorders 104 and 108. The interface unit simultaneously acquires video data by way of the camera 106 and one or more channels of analog data from the monitoring device(s) 102. The interface unit 100 combines the video data received from camera 106 with a time code signal before passing it to the video recorder 108 and, likewise, combines the analog data received from the analog monitoring devices 102 with the same time code signal before passing it to the tape recorder 104. The time code signal is of the kind used by broadcasting stations to time-stamp video signals. Hence, during subsequent analysis of the recorded data, it is possible to refer to the linear time code to detect contemporaneous portions of the data from video and analog sources and hence determines the various responses to a particular event.

Figure 2:
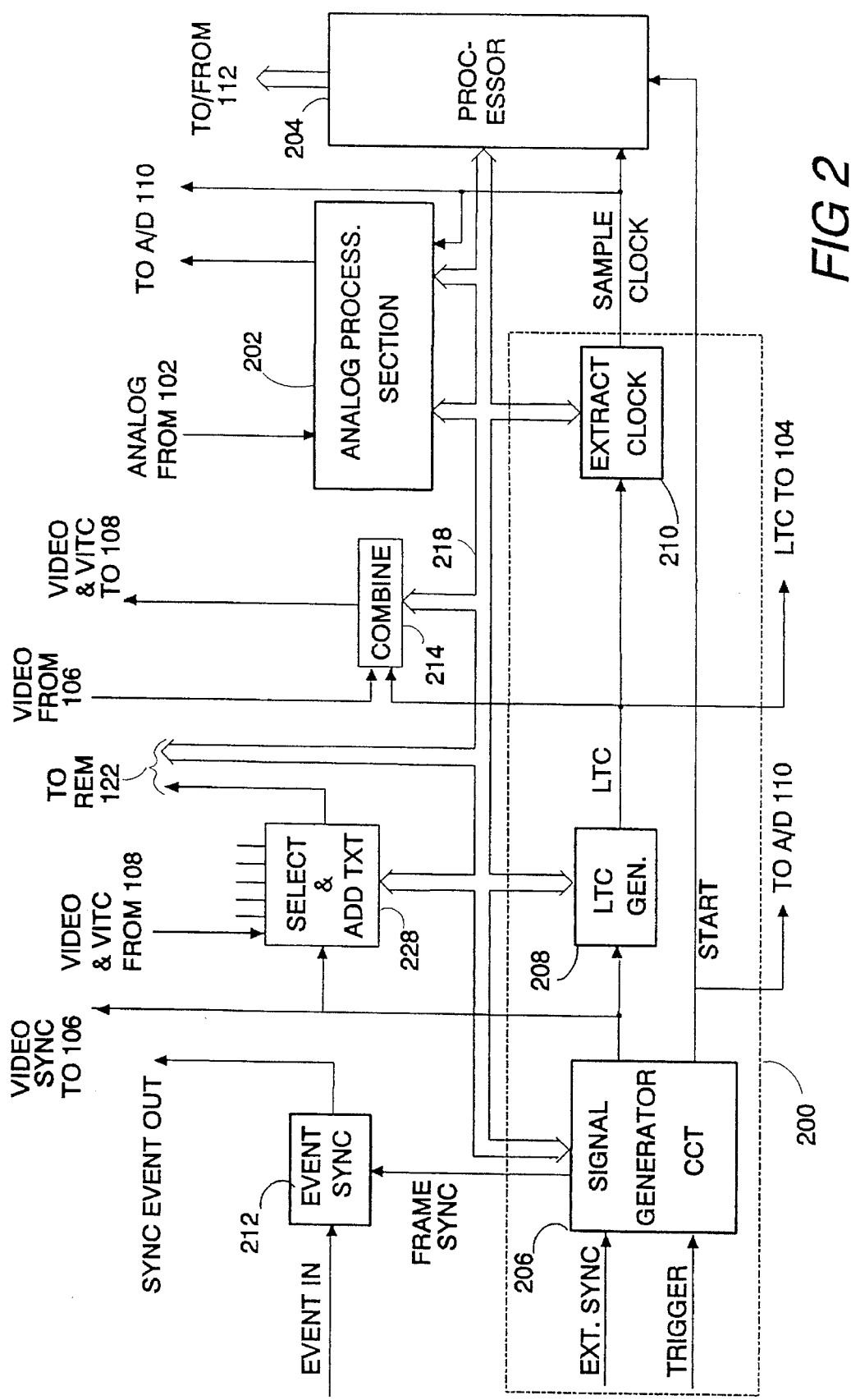
FIG. 2 is a block schematic diagram of the interface unit of FIG. 1, together with the associated computer, and identifying their functional component parts in more detail.
Figure 4:
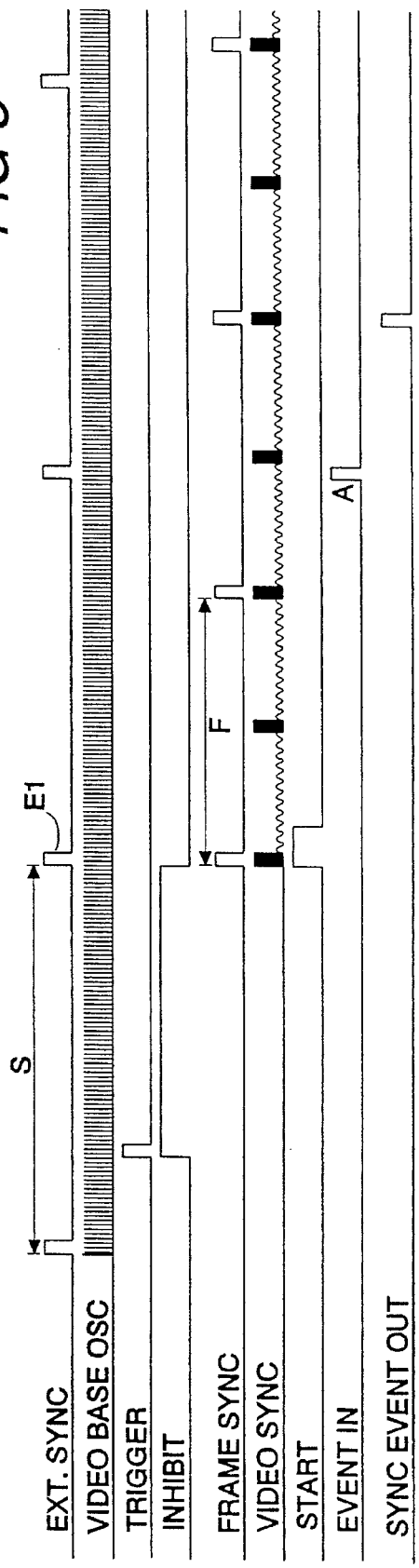
FIG. 4 is a timing diagram relating to the video sync generator.

FIG. 2 illustrates the interface unit 100 in more detail and shows it to comprise a timing section 200, an analog section 202 and a processor section 204. The timing section 200 provides timing/clock signals which will be used for the video sync signal for camera 106, time-stamping recorded video and analog data, generating signals to start and stop recording and other devices and, possibly, synchronizing "event" signals to the video sync signal, The timing section 200 comprises a signal generation circuit 206, a linear time code (LTC) generator 208, and a sample clock extractor 210. The signal generation circuit 206 generates a VIDEO SYNC signal, a FRAME SYNC signal and a START signal in response to the TRIGGER signal and an internal timing signal which, optionally, may be synchronized to an external synchronization signal EXT SYNC. The signal sync circuit 206 will detect whether or not a usable external timing signal is applied and, if not, rely upon its internal timing signal. The video sync signal, time code signal and sampling clock signal will all be synchronized to this timing signal. As shown in FIG. 4, the START pulse initiates generation of the VIDEO SYNC signal which comprises the usual video composite signal with field pulses at regular intervals. The FRAME SYNC signal comprises a series of frame pulses coincident with alternate field pulses of the video sync signal. The START pulse may itself be synchronized to an EXTERNAL SYNC timing signal as will be described later. The signal sync circuit 206 supplies the START signal to processing unit 204 and computer 112. The START signal is used to control the starting of the A-D converter 110, and any video frame grabber 125 optionally installed in the computer 112, to synchronize them precisely with the start of a time code frame whose value will be recorded by the computer 112. No matter how long a session lasts, precise points of correspondence can be determined for any event among all digital, analog and video records. To stop the A-D converter 110 and video frame grabber 125, where installed, the computer 112 will send a STOP signal to them by way of computer bus 706.

As mentioned previously, some events for which data is to be collected occur at irregular intervals. These may involve pulses from sensors or devices which generate stimuli. In order to ensure that asynchronous events are synchronized to the recording apparatus, the interface unit 100 includes event synchronization means 212, which may be hardware logic components or be implemented by software in the processor 204. The event synchronization means 212 combines the EVENT IN signal with the FRAME SYNC signal in such a way that one, and only one, output pulse SYNC EVENT OUT occurs at the start of the first video frame following the occurrence of the asynchronous event (see FIG. 4). This SYNC EVENT OUT pulse might then be used to initiate application of a stimulus to the subject so that it occurs only at the beginning of a video frame.

The signal generation circuit 206 supplies the video sync signal to the camera 106 (FIG. 1) and also to linear time code (LTC) generator 208, which generates an LTC signal synchronized to the video sync signal. The LTC generator 208 is capable of generating either an SMPTE or EBU time code signal and is controlled by the processor 204, via bus 218, to select either one or the other depending upon whether NTSC or PAL video format is being used by the camera 106 or, if no camera is being used, the signal generation circuit 206. As illustrated in FIG. 6, the linear time code signal LTC comprises a coded digital signal, the actual code representing time and frame number. For the SMPTE and PAL time codes supported by the specific embodiment of the invention, the absolute time of a sample is represented according to the following notation:

hh:mm:ss:ff:uu—where hh= hours (00–23), mm= minutes (00–59), ss= seconds (00–59), ff=frames (00–29 for SMPTE, 00–24 for EBU), and uu=units (00–79).

This linear time code signal can be stored as an analog signal on one track of a multitrack storage medium such as a multitrack magnetic tape recorder or a VCR. The LTC generator 208 supplies the LTC signal to one channel of the tape recorder 104 for simultaneous recording with the analog data. It also supplies the LTC signal to a signal combining circuit 214 which, under the control of microprocessor 204, combines it with the raw video signal from the camera 106 as a vertical interval time code (VITC) signal and then supplies the combined signal to the video tape recorder 108 (FIG. 1). The signal combiner 214 could combine the LTC time code itself with the raw video, if so instructed by the microprocessor 106.

The external timing signal EXT SYNC may occur at the same rate as the desired video frame rate, at another video frame rate (e.g. when converting from PAL to NTSC formats) or at a rate determined by a clock or time base in another piece of equipment. As mentioned earlier, it may not be possible for a particular monitoring device to be synchronized to the signals generated by the interface unit 100. The particular monitoring device may, however, provide an external timing signal which is acceptable by the interface unit as the timing signal EXT SYNC. For example, the EXT SYNC signal may be a 1 kHz. clock signal extracted from the IRIG-B time code commonly used with analog instrumentation tape recorders and which comprises a 1 kHz. amplitude-modulated sine wave.

The LTC generator 208 also supplies the LTC signal to sample clock extractor 210 which derives from it the sampling clock signal SAMPLE CLOCK. The sample clock extractor 210 supplies the SAMPLE CLOCK signal to the A-D converter 110, to control the sampling of the analog data, to the processor 204 and to the analog section 202. The sampling clock SAMPLE CLOCK is at a rate which is much higher than the video frame rate enabling sampling of various data channels at rates higher than the standard video frame rates while keeping track of the video frame to which the data corresponds. Since the sampling rate at which the A-D converter 110 will sample the analog data is determined by this sampling clock signal, there is always an integral number of samples for each video frame.

The analog section 202 processes and conditions the analog data from the monitoring device(s) 102 (FIG. 1) in various ways, to be described in more detail later, and supplies the processed analog data to A-D converter 110 (FIG. 1) by way of a suitable output port.

The processor 204 interfaces with the host computer 112 (FIG. 1) via the RS 232 interface 114, and with the analog section 202 and the sample clock generator 210 by its data bus 218. The processor 204 is capable of controlling gain and offset applied to the analog signal by the analog section 202 and recording the degree of any changes and when they occurred. It is often desirable to change the gain during a study period or experiment in order to compensate for changes in the amplitude of the analog signal and ensure that, for example, the signal is not so small that noise becomes excessive or so large that "clipping" occurs. The process controller 204 not only changes the gain and records the gain changes, but also takes the changes into account when processing the acquired data for analysis, as will be described in more detail later.

Figure 3:
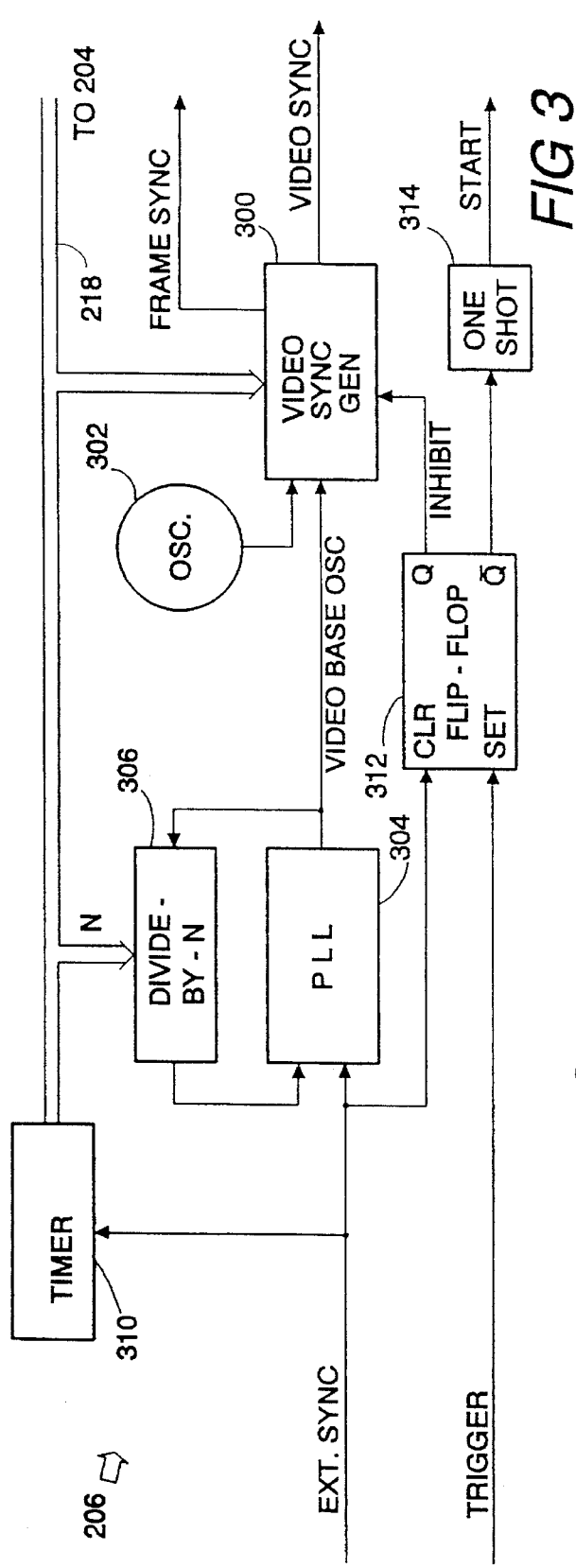
FIG. 3 is a block schematic diagram of a video sync generator of the interface unit.

The component parts of the interface unit 100 of FIG. 2 will now be described in more detail with reference to FIGS. 3 to 9. Referring first to FIG. 3, which shows the signal generation circuit 206 in more detail, and FIG. 4 which is the related timing diagram, the signal generation circuit 206 comprises a video sync generator 300, for example model number MC1378FN by Motorola Corporation, which generates an NTSC video sync signal VIDEO SYNC and a corresponding frame signal FRAME SYNC in response to a video base oscillator signal VIDEO BASE OSC applied to one of its inputs and, if necessary, a color burst signal (3.59 MHz. for NTSC) applied to a second input by a crystal controlled oscillator 302.

The video base oscillator signal is derived by a phase locked loop (PLL) circuit 304, divide-by-N device 306, and digital timer 310. Each pulse of the external sync signal EXT SYNC resets the digital timer 310 which measures the interval between adjacent pulses them by counting an internal reference clock signal which is at a much higher rate, e.g. about 10 MHz. The output from the digital timer 310 is supplied by way of data bus 218 to the processor 204 which uses it to compute a factor N which, when multiplied by clock rate of the external timing signal EXT SYNC signal will result in the basis frequency VIDEO BASE OSC used by the video sync generator 300 to generate the video composite synchronization signal VIDEO SYNC. The processor 204 supplies the factor N, as divisor, to the divide-by-N 306 by way of data bus 218. The divide-by-N divides the output of the phase-locked loop circuit 304 by N and applies the resulting signal to the feedback input of the phase-locked loop circuit 304 to stabilize its output signal VIDEO BASE OSC. As a result, when the video sync generator 300 uses the VIDEO BASE OSC signal to generate the video composite synchronization signal VIDEO SYNC, the resulting frame rate FRAME SYNC will be locked in the prescribed integer ratio to the original timing signal EXTERNAL SYNC. For example, if converting from 50 Hz. to 60 Hz. the ratio will be 5:6.

Where there is no external timing signal EXT SYNC, the PLL 304 will settle at its centre frequency to provide the required timing signal internally. Alternatively, the video sync generator 300 might be switched by the processor 204, via bus 218, to use its own internal oscillator for the internal timing signal.

It is often desired that video frames produced by the system start precisely synchronously with one particular instance or pulse of the external timing signal EXTERNAL SYNC (for example on the leading edge of the 1 kHz. IRIG-B clock pulse that marks the beginning of its one second frame interval). To facilitate this, the signal sync circuitry of FIG. 3 also includes circuitry for causing the VIDEO SYNC signal and the FRAME SYNC signal from the video sync generator 300 to be precisely aligned with the first pulse of the external timing signal EXT SYNC which follows the occurrence of the TRIGGER signal. Thus, the external timing signal EXT SYNC and the TRIGGER signal are also applied to the Clear and Set inputs, respectively, of a bistable device, flip flop 312. The Q and $\overline{Q}$ outputs of the flip flop 312 are connected to, respectively, the INHIBIT port of the video sync generator 300 and a monostable device 314. Referring also to the timing diagram FIG. 4, in operation, the trigger signal TRIGGER sets the flip flop 312 causing its Q output to reset. This inhibits the video sync generator 300 from providing the video composite synchronization signal VIDEO SYNC. The next-occurring pulse E1 of the external timing signal EXTERNAL SYNC clears the flip flop 312, causing the video sync generator 300 to start generating the video composite synchronization signal VIDEO SYNC. At the same time, the inverted output $\overline{Q}$ of flip-flop 312 causes the one shot monostable 314 to provide the start pulse START causing the processor 204 to commence data acquisition.

It is sometimes desirable for the VIDEO SYNC and time code to be running continuously, with the computer 112 acquiring data only for short sequences occurring at known time code values. The processor 204 in interface unit 100 may also be equipped with a time code reader and may be sent a particular time code value, via computer 112, at which the operator wishes to begin digitizing data, for example, a time code value associated with a particular feature noted in previously tape recorded data or the next time code value that will occur following a request by the operator to begin digitizing data. In this case, microprocessor 204 can be programmed to compare the time code values that it receives continuously from the time code reader until it finds a match with the desired time code whose value is one frame less than that desired. Microprocessor 204 then produces an output pulse which is one frame time long and which is combined in a logical AND function with the FRAME SYNC pulse produced by VIDEO SYNC generator 300. The resultant output is a pulse whose leading edge occurs precisely at the beginning of the desired time code frame, which can then be used as the START pulse to initiate digitization in A/D 110 and the sample COUNTER 712 in microprocessor 204.

The FRAME SYNC and VIDEO SYNC signals from the video sync generator 300 will continue to have a precisely known relationship to the EXTERNAL SYNC signal that initiates data acquisition for any number of frames after they begin to be generated, because the VIDEO BASE OSC signal is an integer-multiple of the EXTERNAL SYNC signal. For example, if the EXTERNAL SYNC signal is at the frame rate for the PAL video standard (25 Hz.), then by selecting an appropriate factor N and operating the video sync generator 300 in NTSC mode, the FRAME SYNC and VIDEO SYNC will occur at the NTSC rate of 30 Hz. and will be locked so that every sixth video frame is aligned precisely with every fifth EXTERNAL SYNC pulse.

It is possible that the VIDEO BASE OSC signal produced by the phase locked loop circuit 304 will not be sufficiently accurate to enable the video sync generator 300 to produce a color-burst oscillator signal that is sufficiently close to the NTSC standard to permit video chroma information to be transmitted correctly. Accordingly, the video sync generator 300 switches the output of the color-burst oscillator 302 into the video composite synchronization signal during the colorburst interval. It is not necessary for this color burst signal to have any particular phase relationship to the rest of the video composite synchronization signal.

The way in which the sample clock extractor 208 extracts the bit rate from the linear time code signal LTC will be now be described with reference to FIG. 5 and the associated timing diagram FIG. 6.

The linear time codes supported by the specific embodiment of the invention (SMPTE and EBU) use an encoding scheme in which the bit timing and bit values are encoded by both positive- and negative-going transitions of the linear time code carrier as shown in FIG. 6. The novel sample clock extractor 210 identifies the transitions of the LTC signal which correspond to the bit clock while ignoring those which correspond to the encoding of bit values equal to 1.

As shown in FIG. 5, in the sample clock extractor 210, the LTC signal is applied to the input of an amplifier 500 which conditions it to provide a digital signal AMP OUT. The amplifier 500 applies the signal AMP OUT directly to one input of an EXCLUSIVE-OR gate 502 and to a low pass filter formed by resistance 504 and capacitor 506. The low pass filter 504,506 slows the transitions to produce a signal AMP OUT* which it applies to the other input of EXCLUSIVE-OR gate 502. The EXCLUSIVE-OR gate 502 will respond to the differences between the signals at its input to produce the signal XOR OUT which, as shown in FIG. 6, comprises a series of identical pulses which correspond to all positive-going and negative-going transitions in the original LTC signal. The exclusive-OR gate 502 applies this output signal XOR OUT to a non-retriggerable one-shot 508 which introduces a delay d equal to 0.75 of the bit clock period b of the LTC signal. As soon as the first bit of value equal to 0 occurs in the linear time code signal LTC, the output of the one-shot 508 becomes a correct representation of the original Bit-clock of the linear time code signal LTC. Thereafter, the Bit-clock output from the monostable 508 remains valid regardless of the linear time code signal values.

Finally, the monostable 508 applies the bit-clock signal to a divide-by-M pre-settable digital counter 510 which divides it by a process parameter $\underline{M}$ supplied by the processor means 204, by way of data bus 218, to provide the sampling clock signal SAMPLE CLOCK. For convenience, the signals shown in FIG. 6 are for M=2. M is determined by the desired sampling rate for the A-D converter 110 (depending upon input signal type and what information is to be extracted from the data).

Deriving the SAMPLE CLOCK signal from the linear time code signal LTC ensures that the analog data can be stored and re-digitized repeatedly without introducing variability in the digitized values. Thus, the sampling points of the analog data derived during playback of the tape will always occur at exactly the same points in the data even if there are fluctuations in the playback speed of the tape recorder. These sample times can always be assigned an unambiguous absolute time of occurrence in terms of the value of the frame being encoded by the time code signal and the number of "ticks" of the Bit-clock that have occurred since the most recent frame began.

Figure 7:
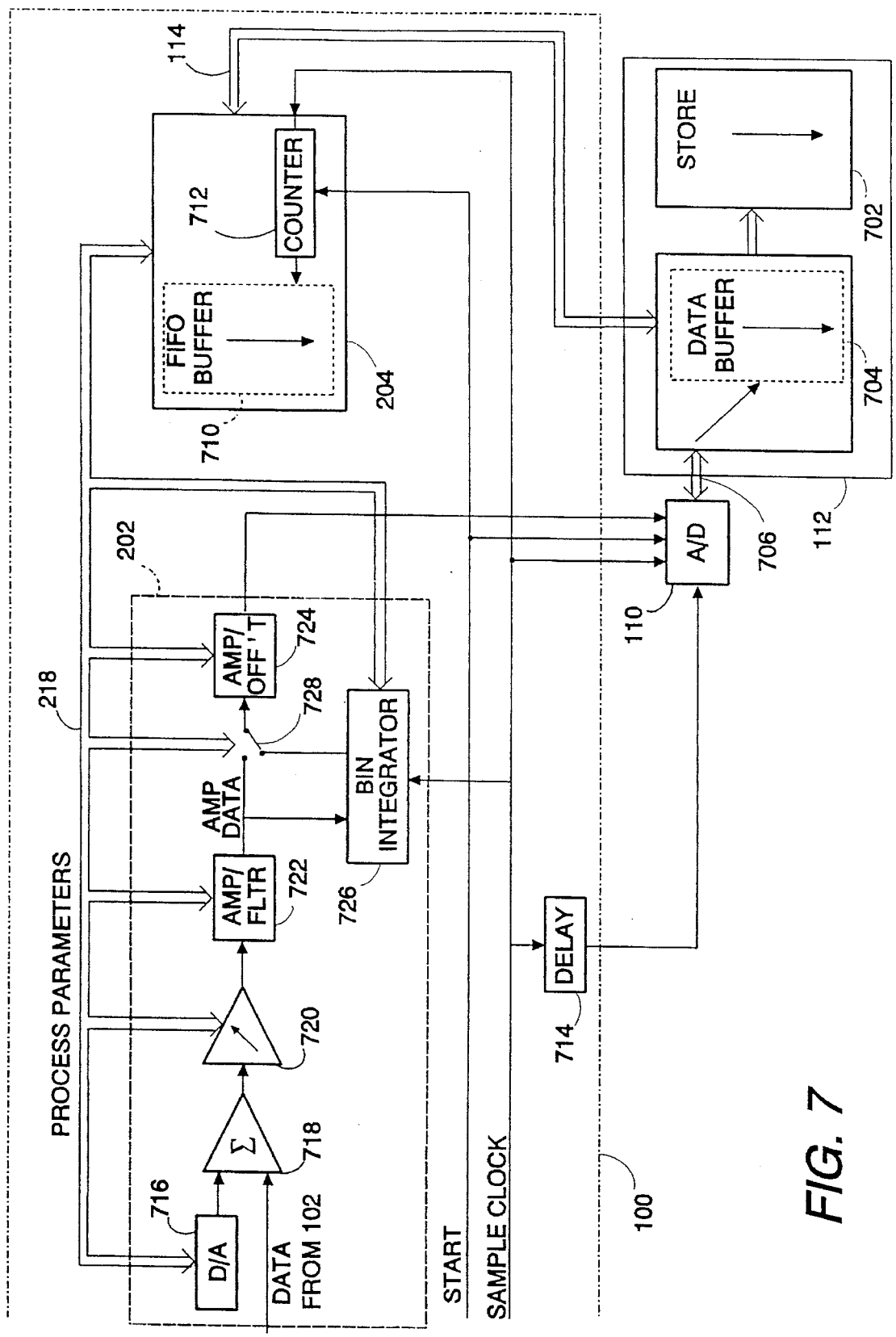
FIG. 7 is a block schematic diagram of a dynamic process control portion of the interface unit of FIG. 2.

As mentioned previously, the analog section 202 conditions the analog signals from the monitoring devices 102 before supplying them to the A-D converter 110. Ideally, their dynamic range of voltages corresponds as much as possible to the input voltage range of the A-D converter 110. The dynamic range can be controlled by the user by way of the computer 112 and processor 204. FIG. 7 illustrates in more detail the analog section 202 and components of the interface unit 100 and computer 112 involved in controlling its dynamic range. Thus, computer 112 is shown with a store 702 and a data buffer 704 for buffering the processed and digitized analog data before storage. The store 702 holds time-stamped data files for digitized data from the analog devices 102 (FIG. 1) and other information such as configuration files for each device, subject files containing relevant information on experimental subjects and "logbook" files to record entire experimental sessions with pointers to all relevant data, subject and configuration files.

The processor 204 is connected via RS 232 bus 114 to the computer 112 and includes a FIFO buffer 710 whose index is kept by counter 712. The counter 712 counts pulses of the SAMPLE CLOCK signal from sample clock generator 208 (FIG. 2) and is reset by the START signal from signal generation circuit 206 (FIG. 2). The counter 712 supplies the count to FIFO buffer 710. The SAMPLE CLOCK and START signals are also supplied to the analog-to-digital converter 110 and, indirectly to the computer 112 via the additional circuitry on the real-time data acquisition card which, as mentioned previously, comprises the analog-to-digital converter 110. The SAMPLE CLOCK signal is supplied to the A-D converter 110 by way of a delay 714, the purpose of which will be explained later.

The analog section 202 comprises a D-A converter 716, a summing amplifier 718 and a programmable gain amplifier 720, programmable signal conditioning circuits 722 and 724, and a bin integrator 726. The PROCESS PARAMETERS to set the D-A converter 716 are supplied to it via the data bus 218 and its output is connected to one input of the summing amplifier 718. The analog data from the various monitoring devices 102 (FIG. 1) is supplied to the other input of summing amplifier 718 and the output of summing amplifier 718 is applied to the input of the programmable gain amplifier 720. The gain of programmable gain amplifier 720 is controlled by parameters received from the microprocessor 204 by way of the data bus 218.

The analog data may comprise various kinds of signals. Some, for example, may be DC-coupled and require offsets. Others may require varying levels of high pass or low pass filtering. Accordingly, the output of the programmable gain amplifier 720 is supplied to a pre-processing circuit 722 which comprises appropriate amplifiers and filters, the details of which are not described here since they are conventional. The output of pre-processing circuit 722, the signal AMP DATA, is supplied to a bin integrator means 726 and the output of the bin integrator means 726 is supplied to a second signal conditioning circuit 724. The output of the second programmable signal conditioning circuit 724, the signal BIN DATA, is supplied to the A-D converter 110 which digitizes it and supplies the digital signal to the data buffer 704 in computer 112. The second signal conditioning circuit 724 comprises an amplifier and D-A converter connected in similar manner to amplifier 718 and D-A converter 716 which compensate for any attenuation of the signal by bin integrator 726. Such attenuation is likely when a short bin interval is employed, e.g. much less than one millisecond, when the bin-integrator is configured for a 1 millisecond period giving unity gain; or the ratio of the signal maximum to the signal average is large (signal with lots of spikes). Also, where the bin integrator 726 uses a full-wave rectifier, as will be described later, the circuit 724 will provide any offset needed to centre the signal in the range of the A-D converter 110.

In general, where the analog signal is asynchronous with and faster than the sampling rate of the A/D converter 110, it could be subject to uncertainty because the voltage level which is actually recorded might not reflect the mean value of the signal for the entire period between sampled values. The bin integrator 726 overcomes this problem by accumulating charge during each sample clock period. Locking the period of the bin integrator 726 to the sampling rate of the A/D converter 110 causes it to behave like a continuously adjustable low-pass filter whose properties are always optimally matched to the sampling rate of the A/D converter 110.

The computer 112 is programmed with user-determined criteria according to which the computer 112 will monitor the digitized values being received in its data buffer 704 to determine whether or not any signal is too large, too small, or biased towards some limit. These criteria might be set by the range of, for example, the A-D converter 110. If the computer 112 determines that the offset should be changed, it sends instructions via the communications bus 114 to the microprocessor 204 to send new values for offset to the D-A converter 716 via data bus 218 to change the offset. Conversely, if it determines that the gain should be changed, it instructs the microprocessor 204 to send the appropriate PROCESS PARAMETER via bus 218 to programmable gain amplifier 720 to change the gain.

The computation of the desired change and its transmission to the amplifier stage components requires an unpredictable amount of time vis-a-vis the data acquisition process. In order to prevent uncertainties about the timing of the implementation of the change from producing uncertainties in the value or interpretation of the digitized data, the processor means 204 ensures that (i) each change occurs between digitization samples, allowing enough time for the voltage of the analog signal to settle at its new value before being digitized; (ii) the change occurs at a known point in the sequence of digitized values stored in the data buffer 704; and (iii) the data values which are eventually retained in the storage files 702 are corrected for the various changes in the PROCESS PARAMETERS that occurred during their acquisition.

In order to ensure that the change occurs between digitization samples, the microprocessor 204 sends the new PROCESS PARAMETERS out onto the data bus 218 for only a brief period just following the detection of the onset of the SAMPLE CLOCK. As shown in FIG. 7, the SAMPLE CLOCK signal is supplied to the A-D converter 110 by way of a delay 714. The duration of the delay 714 is just sufficient to delay acquisition of data by the A-D converter 110 until any changes initiated by new PROCESS PARAMETERS have been implemented by the programmable gain amplifier 720 and/or D-A converter 716 and for the changes effected in their respective outputs to stabilize before the voltage is digitized by the A-D converter 110. The delay also provides settling time for a sample-and-hold 816 (to be described with reference to FIG. 8) when bin integration is used.

To ensure that the changes occur at a known point in the sequence of digitized values stored in the data buffer 704, the digital counter 712 in the microprocessor 706 is set to zero upon the occurrence of a START pulse and is incremented by each subsequent occurrence of a SAMPLE CLOCK pulse. Since accumulation of the samples in data buffer 704 of the computer also is initiated by the START pulse, the value in counter 712 always corresponds to the number of samples accumulated in the data buffer 704 in computer 112, which maintains a similar count by counting digitized data. Whenever the microprocessor sends a new PROCESS PARAMETER out on the data bus 218, it records the new value and the current value of the counter 712 in the FIFO buffer 710.

To correct the data values eventually retained in the storage files 702 for the various changes in gain and offset which occurred during their acquisition, at the end of an acquisition period, the microprocessor 204 sends the contents of the FIFO buffer 710 to the computer 112 which uses them to correct the corresponding values in the data buffer 704 before writing them into the storage files 702. For example, if the gain of the programmable gain amplifier 720 was decreased by a factor of two at some point during the data acquisition, then the digitized data values which were acquired subsequent to that point should be multiplied by a factor of two. Thus, the processor 204 will update the stored values in this way so that all of the values in the storage file 702 will be referred to the same, constant gain factor. As another example, if the offset applied to the analog signal by the D-A converter 716 has been changed, then this is corrected by adding a constant value to the corresponding data in the data buffer 704 to reflect the change in the offset multiplied by the currently effective gain.

Appropriate adjustment of the gains and/or offsets in this way can greatly extend the effective dynamic range of a given A-D converter 110 and avoid the increased cost and reduced sampling rate usually associated with high resolution A-D converters.

As mentioned previously, to avoid problems of uncertainty when the amplitudes of the analog signals change at rates which are asynchronous with and faster than the sampling rate of the A-D converter 110, the signal AMP DATA from the amplifier 722 may be passed through bin integrator 726. As shown in FIG. 8, the bin integrator 726 comprises an analog integrator formed by a capacitor 800 which is connected between the output and the inverting input of an operational amplifier 802, the non-inverting input of which is grounded.

The Amp Data from amplifier stage 722 is supplied to the inverting input of integrating amplifier 802 by way of an electronic switch 804. The Amp Data signal is applied directly to one input of the switch 804 and by way of a full-wave rectifier circuit 806 to a second input of the switch 804. The switch 804 is controlled by the microprocessor 204 by way of data bus 218 to select either of the two inputs. The data bus 218 also supplies PROCESS PARAMETERS to the full wave rectifier circuit 806, which will be described in more detail later.

In operation, the capacitor 800 accumulates charge and is discharged intermittently by an electronic switch 834 which is connected in parallel with the capacitor 800. The switch 834 should be capable of transmitting bipolar signals, such as an Analog Devices ADG212AK switch. The switch 834 is operated by the sampling clock signal SAMPLE CLOCK after it has been delayed by a pair of a monostable device 810 and 812 which are interconnected by an inverting amplifier 814. Each of the monostable devices 810 and 812 provides a delay of 10 microseconds. The SAMPLE CLOCK signal is applied to the input of monostable device 810 and the output of the second monostable device 812 operates the switch 834. The output of the first monostable 810 is also applied to a sample-and-hold circuit 816 connected between the output of the integrating amplifier 802 and the processor 204 (FIG. 2).

Referring also to the timing diagrams in FIG. 9, just prior to each resetting of the analog integrator by closure of the switch 808, current output of the integrator (waveform 7 in FIG. 9) is transferred to the sample-and-hold circuit 816, which maintains this value as its output value (Bin Data waveform in FIG. 9) for the duration of the next period of the SAMPLE CLOCK, during which the integrator accumulates a new output voltage. The A-D converter 110 can digitize the Bin Data signal at any time during the SAMPLE CLOCK period and will always record a voltage whose amplitude corresponds to an equally weighted accumulation of all of the voltage fluctuations that might have occurred in the input signal during the previous SAMPLE CLOCK period and only the one previous period. For example, the bin integrator may have a "binning frequency", i.e. the rate at which the capacitor is discharged, of between 30 Hz. and 2400 Hz., conveniently one of 12 fixed values in that range which are multiples of the basic frame rate.

The full-wave rectifier circuit 806 comprises two operational amplifiers 818 and 820. The outputs of the amplifiers 818 and 820 are connected by diodes 822 and 824, respectively, in common, to the switch 804 and by way of a resistor 826 to ground. The output of amplifier 818 also is connected to the inverting input of amplifier 820. The Amp Data signal is applied by way of a capacitor 828 to the inverting input of amplifier 818. The respective non-inverting inputs of the amplifiers 818 and 820 are connected in common to a positive supply rail $+V_S$ by way of resistor 836 and by way of a diode 830 to the output of a programmable D-A converter 832. The D-A converter 832 is supplied from a negative supply rail $-V_S$ and has its input connected to the data bus 218 to receive the PROCESS PARAMETERS from microprocessor 204 (FIG. 7).

If the voltage applied to diode 830 by the programmable D-A converter 832 is set to zero (grounding the diode), then the full-wave rectifier 806 operates with zero bias, such that all of the Amp Data waveform at the input contributes to the output at switch 804 (waveform 3 in FIG. 9). When, as sometimes happens, it becomes desirable to exclude low amplitude portions of the input signal that may reflect noise from contributing to the output of the bin integrator 726, the PROCESS PARAMETERS signal will cause the programmable D-A converter 832 to supply more negative output voltages causing the full-wave rectifier 806 to exclude portions of the AMP DATA signal that fall below successively higher absolute values of both polarities.

If the AMP DATA signal is full-wave rectified by rectifier 806 before passing through switch 804, the bin integrator computes the area enclosed between the signal and zero. In order to allow the bin integrator 726 to operate upon the original AMP DATA signal, which is sometimes desirable, the full wave rectifier 806 may be switched out of circuit by switch 804.

As mentioned previously, with its period locked to the sampling rate of the A-D converter, the bin integrator 726 constitutes a continuously adjustable low-pass filter whose properties are always optimally matched to the sampling rate of the A-D converter. If the sampling rate is changed to a new value, the bin integrator requires no change other than to assure that the gain of the input signal is adjusted so as to properly use the available dynamic range of the integrator 802/800, Sample-and-Hold device 816 and A-D circuitry 110. That is, if the SAMPLE CLOCK period is increased by a factor of two, then the gain of the analog section 202 (FIG. 7) providing the AMP DATA signal to the input of the bin integrator 726 should be reduced by a factor of two to maintain a similar output value. These changes are easily implemented and recorded by the microprocessor 204 in a similar manner to that described with respect to FIG. 7.

The invention comprehends various modifications and alternatives to the features of the specific embodiments described above.

Thus, although a manual input (push-button) 120 has been described for generating the TRIGGER signal, the latter might also, or alternatively, be generated by the host computer, perhaps automatically when certain conditions apply, or in response to operation of a mouse button; or by way of the remote monitoring device.

Although the specific embodiment mentions that the time code signal might be LTC or VITC versions of either SMPTE or EBU, it is envisaged that other time codes might be used instead. For example, the time code might be ASCII encoded data on an RS-232 serial interface for the computer.

In the specific embodiment, the sample clock extractor 210 provides a bit-clock which is synchronous with and at a rate of exactly 80 times the video frame rate. A range of sample clock rates that are integer multiples of the video frame rate can be produced by dividing the bit clock by the desired integer value M using a pre-settable digital counter. If sampling rates higher than 80 times the video frame rate are required, they can be produced by a phase-locked loop that is driven by the bit-clock.

If more than 16 channels of analog data are to be handled, additional "slave" interface units 100A, 100B, etc. may be added, each associated with additional monitoring devices 102A and tape recorders 104A and coupled to the "master" interface unit 100 by an expansion bus 101, as shown in dashed lines in FIG. 1. The signals SAMPLE CLOCK and START, and instructions for selecting PROCESS PARAMETERS, are passed to the slave unit(s) by way of the expansion bus. The slave unit will supply data from its inputs directly to the computer 112 by way of the A-D converter 110, if it has the capacity, or by way of an additional A-D converter if necessary. Each slave interface unit includes one analog signal processing stage 202 for each of 16 additional channels, and is coupled the a preceding slave unit or the master interface unit by a communication bus 218A for communication with the data bus 218 of the processor 204. Because the slave units do not include the time code and synchronization circuitry, they can be relatively inexpensive. It is also possible, however, to add a second "master" interface unit 100 communicating via a second RS232 port, or sharing the same RS 232 interface providing only one is enabled to communicate with the computer at any particular time.

In FIGS. 1 and 7, the computer 112 is shown separate from the interface unit 100. It should be appreciated, however, that it could be combined with the interface unit 100 and take over the functions of processor 204.

Also, although tape recorders have been shown and described, it will be appreciated that these recording devices could be replaced by direct digitization and storage by the computer.

It is often desirable, during laboratory experiments, to control the experiment and monitor the data at a position remote from the computer itself. In FIG. 1, remote monitoring unit 122 is coupled to the interface unit 100 by, for example, a commercially available infra-red link 124 which couples the data bus 218 from microprocessor 204 and the output of video selector and display unit 228 to the remote unit. As shown in FIG. 2, the input of the selector and display unit 228 is connected to the monitoring port of each video recorder 108 from whence it receives the combined video and vertical interval time code signal. The selector unit 228 comprises a selector for selecting one of several video input signals and a computer graphics card for generating a video-formatted display including the time code and other information supplied by the processor 204 and/or computer 112. The graphics card superimposes the video-formatted display upon the selected video signal and sends the combined signal to the remote monitoring unit 122 via the link 124.

The selector 228 has one input connected to the output of signal generation circuit 206 to receive the VIDEO SYNC signal. In the absence of a video signal from the video recorder 108, the selector circuit 228 will supply the time code and any text, etc. for display on a black level background.

Figure 10:
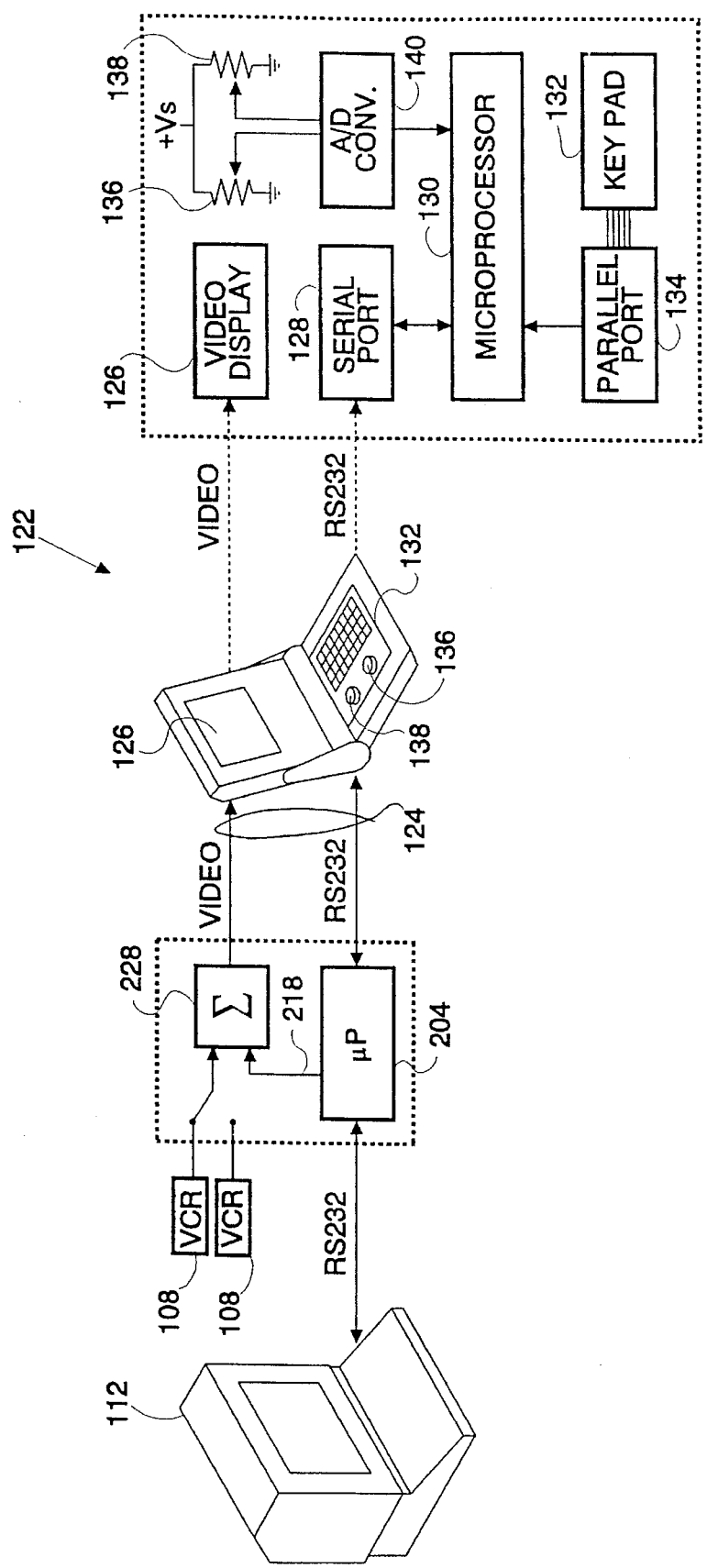
FIG. 10 shows a remote monitoring unit connected to the interface unit.

As shown inset in FIG. 10, in the remote monitoring unit, the video signal is supplied directly to a liquid crystal display 126. The data bus 218 is coupled to an RS232 serial port 128 and thence to a microprocessor 130, typically a Motorola 68 HC11. A keypad 132 is connected to the microprocessor 130 via a parallel port 134. A pair of continuously-variable potentiometers 136 and 138, respectively, are coupled to the microprocessor 130 via its A-D converter 140 which monitors the voltage applied across them and provides a digital equivalent. The keypad 132 and potentiometers 136 and 138 allow the user to transmit commands and process parameters via microprocessor 130 and the RS232 connection in link 124 to the microprocessor 204 and, as appropriate, to the computer 112, to control the apparatus from a position remote from the computer 112 and/or the interface unit 100.

The microprocessor 130 receives digitally encoded commands in a widely supported format such as strings of ASCII characters, which it decodes to perform its main functions. Remote control 122 displays various characters and/or graphic symbols at selected locations on the LCD display 126, some of which may define options currently available via the manual controls. Also, it monitors the condition of the manual controls and transmit corresponding commands to the processor 204/computer 112. The microprocessor 130 may be programmed to wait until specifically queried for its information; or send information immediately any of its controls changes; or send information only when changes occur which exceed a predefined magnitude threshold or duration. The microprocessor may be programmed to display information to assist the user in making selections and may also re-assign functions of the keys of the keypad 132 either during a complex, multi-part task or for different applications. A full keyboard need not be provided since, for most applications, it is preferable to have a few pre-programmed options allowing fast, accurate selection.

It will be appreciated that the video output of selector circuit 228 could be provided as an output of the interface unit to allow separate monitoring by a conventional monitor where no remote control unit is provided.

An advantage of embodiments in which the signal sync circuit uses the external timing signal and the trigger signal to initiate generation of the video composite synchronization signal and the data acquisition is that the video frames are synchronized without interfering with the stability of the phase-locked loop circuit.

It is often desirable to sample various of the other data channels at rates that are faster than standard video frame rates but to be able to keep track of which video frame corresponds to which data samples. An advantage of embodiments of the invention, which derive a sample clock signal from the bit rate extracted from the linear time code signal LTC, which is itself referenced to the video frame rate, is that the sampling rate is less likely to drift than if the sampling rate were generated autonomously from the video frame rate generation, for example by a real-time clock in the computer. Such drifting could result in growing uncertainty about the temporal relationship between a particular data sample and a particular video frame.

An advantage of embodiments of the invention which use a bin integrator is that they are simpler and more effective than, for example, circuits which use a low-pass filter on the analog signal to remove signal frequencies above a cut-off value which is based upon the A-D sampling rate. The design of such analog low-pass filters entails trade-offs between the complexity of the circuitry, the roll-off rate of the filter, and the degradation of the original signal because of attenuation and phase delays of its frequency components that are near the cut-off frequency. Large transients may take many sample periods before they cease to affect subsequent digitized values. Typically, changing the cut-off frequency of such filters to accommodate a change in A-D sampling rate is also cumbersome and requires expensive adjustable components such as variable capacitors.

An advantage of embodiments in which the gain and/or offset of the amplifier stage for the analog signals is adjusted during data acquisition in dependence upon the values of the signals is that they avoid problems of drift causing saturation where the signal is excessive or uncertainty where the signal is small and the least significant bit of the digitized signal will reflect an unnecessary proportion of the input signal. Recording the gain and offset adjustments with the data enables corresponding adjustment of the data during a preprocessing phase before analysis.

An advantage of the bin integrator shown in FIG. 8 is that it is simple and reliable and can integrate input voltages of either or both polarities in each period.

An advantage of embodiments of the invention is that the computer can make interconnections and adjustments to the various devices and automatically record the information on a logbook file for a particular user. When that user wishes to use the apparatus again, and logs on to the computer, even though others have used it in the meantime, the computer can be instructed to retrieve the information from that user's logbook and make the same interconnections and adjustments as before. This is especially advantageous in laboratories where equipment is shared.

To illustrate how the system is programmed and used, several sample procedures are set out in the following tables:

TABLE I

| USER ACTIONS | COMPUTER ACTIONS |
|---|---|
| Enter user's personal workspace. | Open last-used logbook files in user's workspace. Offer menu of date acquisition and analysis procedures. |
| Verify experiment logbook to be used. Select tape acquisition mode. Load instrumentation tape reel and video cassette Confirm identity: | Request user to mount and identify tape media |
| . Same as last used | . Advance to next free space, advise on time remaining to end of reel. |
| . Another tape reel listed in master logbook | . Switch to new tape logbook, advance to next free space, advise on remaining time to end of reel. |
| . A new tape reel not identified in master logbook | . Generate identifier, add to master logbook, start new tape logbook. Start LTC Generator at time-of-day, synch. to any active video or TTL source |
| Select tape calibration | Configure interface unit to send tape reproduce to digitizer; ground amplifier inputs. Start tape in record mode, noting timecode. Step interface unit output offsets through +/−5V dynamic range in 1 V steps. Digitize tape output signals and compute calibration factors. Stop tape and make entries into logbooks |
| Review last channel template, change or modify | Set interface unit signal processing modes, gains, filters etc. |
| Select dynamic range adjustment. | Configure interface unit to send Aout to digitizer. |
| Start sample of activity to be recorded. | Digitize signals and send changes warranted to interface unit until desired levels reached. |
| Review signals and channel settings. | Display last section of digitized data and settings. |
| Make manual overrides as desired. | Redisplay to show anticipated effects and send changes to interface unit |
| Request ready-to-record | Set VCR to Record/Pause mode |
| Press remote unit's Start button when activity begins. | Note timecode and start all tape recorders in Record mode. Scan through video signals on remote control unit. Set interface unit to send tape |

TABLE I-continued

| USER ACTIONS | COMPUTER ACTIONS |
|---|---|
| | reproduce to digitizer. |
| | Monitor digitized signals quality and notify user of any problems. |
| Press remote control unit stop button when activity ceases. | Pause tapes; note time code and make entries into experiment and tape logbooks. |

TABLE II

| USER ACTIONS | COMPUTER ACTIONS |
|---|---|
| Enter user's personal workspace | Open last-used logbook files in user's workspace. Offer menu of date acquisition and analysis procedures. |
| Verify experiment logbook to be used. | Locate media logbooks and request user to mount reels |
| Select tape analysis mode. | |
| Identify tape reels to be analyzed. | |
| Load instrumentation tape reel and video cassette. | |
| Select videotape scanning mode. | Set timecode reader to VCR LTC. |
| Identify block to be scanned. | Fast forward to block and go into Play mode. |
| Request analog tape digitizing. | Set timecode reader to analog tape LTC. Fast forward to first block to be digitized. Find most relevant template from experiment logbook. Configure interface unit Ain from tape reproduce, Aout to digitizer; set signal processing. |
| Approve to over-ride analog signal processing. | Digitize first block of tape and suggest signal processing changes to improve dynamic range. |
| Approve or over-ride analog signal processing | Digitize complete data file from selected blocks; update experiment logbook |

TABLE III

| USER ACTIONS | COMPUTER ACTIONS |
|---|---|
| Enter user's personal workspace. | Open last-used logbook files in user's workspace. Offer menu of dat acquisition and analysis procedures. |
| Verify experiment logbook to be used. | Locate last-used template; request confirmation or changes. |
| Select real-time data acquisition mode. | Request user to initialize motion analysis system. Scan sync. input lines and configure as appropriate. |
| Approve or modify template. | Set Timecode generator running at time-of-day |
| Request motion analysis calibration. | Run calibration procedure on motion analysis platform. Record calibration in media logbooks. |
| Select on-line dynamic range adjustment. | Configure unit to send Aout to digitizer; other settings according to template. |
| Request ready-to-record. | Set digitizing platforms to trigger on time match. |
| Press remote control unit Start button when activity begins. | Note time code and set up time match for precise start. Monitor digitized signal quality and send changes to unit according to algorithm selected. |
| Press remote control unit Stop button when activity ceases. | Note timecode and close block entry in data file. Correct data values according to changes noted in FIFO 710 and write to disk file. |
| Request data review. | Display chart recording of multichannel analog data. Run marker confirmation segmentation procedure on motion analysis platform. |
| Save data. | Close files, update logbooks. |

What is claimed is:

1. A monitoring system comprising a plurality of monitoring devices for acquiring data about a subject, an analog-to-digital converter means responsive to a sampling clock signal for digitizing data acquired by the monitoring devices, and interface apparatus for receiving data from the monitoring devices and interconnecting with the analog-to-digital converter means, the interface apparatus comprising timing means including means for generating a time code signal, means for deriving the sampling clock signal from, and synchronized to, the time code signal, and means for supplying said sampling clock signal to the analog-to-digital converter means.

2. A monitoring system as claimed in claim 1, further comprising at least one recording device for recording the acquired data, the timing means being arranged to supply the time code signal to said recording device for simultaneous recording with the corresponding data.

3. A monitoring system as claimed in claim 2, wherein at least one of the monitoring devices comprises a video input device responsive to a video synchronization signal, and the timing means includes signal generating means for generating said video synchronization signal, and means for providing the time code signal in response to the signal generating means to synchronize the time code signal with the video synchronization signal.

4. A system as claimed in claim 3, wherein the signal generating means comprises a video sync generator circuit for supplying a composite video synchronization signal in response to a video base oscillator signal, means for generating the video base oscillator signal and means for selectively inhibiting operation of the video sync generator circuit.

5. A system as claimed in claim 4, wherein the means for generating the video base oscillator signal comprises a phase-locked loop (PLL) oscillator, a divide-by-N device connected in a feedback path around the PLL oscillator, and means for setting the value of the divisor N in dependence upon a selected video frame rate.

6. A system as claimed in claim 5, wherein the interface apparatus includes a processor and the means for setting the value of divisor N comprises a timer operable to count a reference clock signal between reset pulses of an external timing signal and supply the resulting count to the processor for derivation of the divisor N.

7. A system as claimed in claim 3, wherein the signal generation means comprises a video sync generator circuit for supplying a composite video synchronization signal in response to a video base oscillator signal, means for generating the video base oscillator signal in dependence upon an external timing signal and means for selectively inhibiting operation of the video sync generator circuit, the means for selectively inhibiting the video sync generator comprising a bistable device having set and clear inputs and first and second outputs, the set input being connected to means for applying a trigger pulse, the clear input being connected to means for supplying the external timing signal, and the first output being connected to an inhibit input of the video sync generator.

8. A system as claimed in claim 7, wherein the second output of the bistable device is connected to a monostable device, the output of which serves to start the A-D converter.

9. A system as claimed in claim 2, further comprising a video input device, at least one of the recording devices being a video recorder, and wherein the interface apparatus further comprises means for combining the time code with a video signal from the video input device and supplying the combined signal to the video recorder.

10. A system as claimed in claim 9, wherein the combining means combines the time code as a vertical interval time code (VITC).

11. A system as claimed in claim 1, wherein the timing means is operable in response to a trigger signal to initiate generation of the time code signal.

12. A system as claimed in claim 1, wherein at least one of the monitoring devices comprises a video input device responsive to a video synchronization signal, and the timing means signal comprises generating means for generating said video synchronization signal and means for providing the time code signal from, and in synchronism with, the video synchronization signal.

13. A system as claimed in claim 1, wherein the timing means is responsive to an external timing signal derived from one of the monitoring devices to initiate generation of the time code signal.

14. A system as claimed in claim 3, wherein the signal generating means is operable to supply a time code signal in the form of temporal data encoded onto a bit clock, and further comprises means for extracting a sampling clock for the analog-to-digital converter means from the bit clock of the time code signal.

15. A system as claimed in claim 14, wherein the means for extracting the sampling clock signal comprises exclusive-OR logic means, low pass filter means and monostable delay means, the logic means having a first input connected to receive the time code signal unfiltered and a second input connected to the output of the low pass filter to receive the filtered time code signal, the monostable delay means being connected to the output of the logic means and having a delay period duration equal to a predetermined proportion of the bit clock rate of the time code signal.

16. A system as claimed in claim 15, wherein the delay period duration is about three quarters of the period of the bit clock of the time code signal.

17. A system as claimed in claim 16, further comprising means for dividing the extracted bit clock signal by a predetermined factor (M) to obtain the sampling clock.

18. A system as claimed in claim 2, further comprising amplifier means for amplifying analog data from the monitoring devices and means for adjusting one or both of gain and offset provided by the amplifier means, the interface apparatus further comprising processor means for controlling the adjusting means in dependence upon a comparison of parameters of the amplified analog signal with preset criteria.

19. A system as claimed in claim 4, wherein the signal generating means is arranged to generate a series of frame pulses corresponding to the video synchronization signal and the interface apparatus further comprises means for receiving event initiation pulses, for initiating events for the subject, and gating said event-initiating pulses by means of the framing pulses such that each event-initiating pulse is synchronized with the beginning of a frame of the video synchronization signal.

20. A system as claimed in claim 1, wherein the interface apparatus further comprises bin integration means for integrating an analog signal from one of the monitoring devices and comprising an integrator means for integrating the analog signal, sample-and-hold means responsive to the sampling clock signal for repeatedly sampling and storing the output of the integrator means, means for resetting the integrator means after each sampling by the sample-and-hold device, and variable offset full wave rectifier means for rectifying the analog signal before its application to the integrator means.

21. A system as claimed in claim 20, wherein the interface apparatus further comprises switch means for selectively bypassing the rectifier means to apply the analog signal to the integrator means without rectification.

22. A system as claimed in claim 20, further comprising switch means for selectively bypassing the bin integration means to apply the analog signal to the analog-to-digital converter means.

23. A system as claimed in claim 20, wherein the full wave rectifier means comprising amplifier means connected to receive the analog data signal and apply the amplified signal to the integrator means, and means for controlling biasing of the amplifier means so as to selectively exclude low amplitude portions of the analog signal.

24. A system as claimed in claim 23, wherein the means for controlling biasing comprises a programmable digital-to-analog converter controllable by processor means to vary its output between predetermined levels, and diode means connected between the output of the digital-to-analog converter and an input of the amplifier means, whereby varying the output level of the digital-to-analog converter varies the biasing of the amplifier means.

25. A system as claimed in claim 1, further comprising a remote control unit and means for coupling the remote control unit to the interface apparatus from a location remote therefrom, the remote control unit comprising a video display and manual input means connected to a microprocessor, the coupling means allowing transfer of video signals and data to the remote control unit and user-generated commands to the interface apparatus, the interface apparatus comprising means for generating a video formatted signal and transmitting said video formatted signal to the remote control unit by way of the coupling means.

26. A system as claimed in claim 1, further comprising a video recorder and wherein at least one of the monitoring devices comprises a video input device responsive to a video synchronization signal, the interface apparatus comprising means for generating said video synchronization signal, the system further comprising a remote control unit and means for coupling the remote control unit to the interface apparatus, the remote control unit comprising a video display and manual input means connected to a microprocessor, the coupling means allowing transfer of video signals and data to the remote control unit and user-generated commands to the interface apparatus, and the interface apparatus further comprising means for passing video-formatted signals to the remote control unit.

27. A system as claimed in claim 26, wherein the means for passing video formatted signals includes means for combining video signals from the video recorder with graphics supplied by the interface means and supplying the combination to the remote control unit for display.

28. Interface apparatus for use in a monitoring system comprising a plurality of monitoring devices for acquiring and transmitting data about a subject and Operatively interconnected with an analog-to-digital converter means to receive said data and responsive to a sampling dock signal for digitizing data acquired by the monitoring devices, the interface apparatus comprising timing means including means for generating a time code signal and means for deriving the sampling clock signal from, and synchronized to, the time code signal.

29. Apparatus as claimed in claim 28, further comprising at least one recording device for recording the acquired data, the timing means being arranged to supply the time code signal to said recording device for simultaneous recording with the corresponding data.

30. Apparatus as claimed in claim 29, wherein at least one of the monitoring devices comprises a video input device responsive to a video synchronization signal, and the timing means includes signal generating means for generating said video synchronization signal and means for providing the time code signal in response to the signal generating means to synchronize the time code signal with the video synchronization signal.

31. Apparatus as claimed in claim 30, wherein the signal generating means comprises a video sync generator circuit for supplying a composite video synchronization signal in response to a video base oscillator signal, means for generating the video base oscillator signal and means for selectively inhibiting operation of the video sync generator circuit.

32. Apparatus as claimed in claim 31, wherein the means for generating the video base oscillator signal comprises a phase-locked loop (PLL) oscillator, a divide-by-N device connected in a feedback path around the PLL oscillator, and means for setting the value of the divisor N in dependence upon a selected video frame rate.

33. Apparatus as claimed in claim 32, further comprising a processor and wherein the means for setting the value of divisor N comprises a timer operable to count a reference clock signal between reset pulses of an external timing signal and supply the resulting count to the processor for derivation of the divisor N.

34. Apparatus as claimed in claim 30, wherein the signal generation means comprises a video sync generator circuit for supplying a composite video synchronization signal in response to a video base oscillator signal, means for generating the video base oscillator signal in dependence upon an external timing signal and means for selectively inhibiting operation of the video sync generator circuit, the means for selectively inhibiting the video sync generator comprising a bistable device having set and clear inputs and first and second outputs, the set input being connected to means for applying a trigger pulse, the clear input being connected to means for supplying the external timing signal, and the first output being connected to an inhibit input of the video sync generator.

35. Apparatus as claimed in claim 34, wherein the second output of the bistable device is connected to a monostable device, the output of which comprises a start signal for the analog-to-digital converter means.

36. Apparatus as claimed in claim 29, wherein the system further comprises a video input device, at least one of the recording devices being a video recorder, and wherein the interface apparatus further comprises means for combining the time code with a video signal from the video input device and supplying the combined signal to the video recorder.

37. Apparatus as claimed in claim 36, wherein the combining means combines the time code as a vertical interval time code (VITC).

38. Apparatus as claimed in claim 28, wherein the timing means is operable in response to a trigger signal to initiate generation of the time code signal.

39. Apparatus as claimed in claim 28, wherein at least one of the monitoring devices comprises a video input device responsive to a video synchronization signal, and the timing means comprises signal generating means for generating said video synchronization signal and means for providing the time code signal from, and in synchronism with, the video synchronization signal.

40. Apparatus as claimed in claim 28, wherein the timing means is responsive to an external timing signal derived from one of the monitoring devices to initiate generation of the time code signal.

41. Apparatus as claimed in claim 28, wherein the timing means is operable to supply a time code signal in the form of temporal data encoded onto a bit clock, and further comprises means for extracting a sampling clock for the analog-to-digital converter means from the bit clock of the time code signal.

42. Apparatus as claimed in claim 41, wherein the means for extracting the sampling clock signal comprises exclusive-OR logic means, low pass filter means and monostable delay means, the logic means having a first input connected to receive the time code signal unfiltered and a second input connected to the output of the low pass filter to receive the filtered time code signal, the monostable delay means being connected to the output of the logic means and having a delay period duration equal to a predetermined proportion of the bit clock rate of the time code signal.

43. Apparatus as claimed in claim 42, wherein the delay period duration is about three quarters of the period of the bit clock of the time code signal.

44. Apparatus as claimed in claim 43, further comprising means for dividing the extracted bit clock signal by a predetermined factor (M) to obtain the sampling clock.

45. Apparatus as claimed in claim 29, further comprising amplifier means for amplifying analog data from the monitoring devices and means for adjusting one or both of gain and offset provided by the amplifier means, the interface apparatus further comprising processor means for controlling the adjusting means in dependence upon a comparison of parameters of the amplified analog signal with preset criteria.

46. Apparatus as claimed in claim 31, wherein the signal generating means is arranged to generate a series of frame pulses corresponding to the video synchronization signal and the interface apparatus further comprises means for receiving event initiation pulses, for initiating events for the subject, and gating said event-initiating pulses by means of the framing pulses such that each event-initiating pulse is synchronized with the beginning of a frame of the video synchronization signal.

47. Apparatus as claimed in claim 28, wherein the interface apparatus further comprises bin integration means for integrating an analog signal from one of the monitoring devices and comprising an integrator means for integrating the analog signal, sample-and-hold means responsive to the sampling clock signal for repeatedly sampling and storing the output of the integrator means, means for resetting the integrator means after each sampling by the sample-and-hold device, and variable offset full wave rectifier means for rectifying the analog signal before its application to the integrator means.

48. Apparatus as claimed in claim 47, wherein the interface apparatus further comprises switch means for selectively bypassing the rectifier means to apply the analog signal to the integrator means without rectification.

49. Apparatus as claimed in claim 47, further comprising switch means for selectively bypassing the bin integration means to apply the analog signal to the analog-to-digital converter means.

50. Apparatus as claimed in claim 47, wherein the full wave rectifier means comprising amplifier means connected to receive the analog data signal and apply the amplified signal to the integrator means, and means for controlling biasing of the amplifier means so as to selectively exclude low amplitude portions of the analog signal.

51. Apparatus as claimed in claim 50, wherein the means for controlling biasing comprises a programmable digital-to-analog converter controllable by processor means to vary its output between predetermined levels, and diode means connected between the output of the digital-to-analog converter and an input of the amplifier means, whereby varying the output level of the digital-to-analog converter varies the biasing of the amplifier means.

52. Apparatus as claimed in claim 28, further comprising a remote control unit and means for coupling the remote control unit to the interface apparatus from a location remote therefrom, the remote control unit comprising a video display and manual input means connected to a microprocessor, the coupling means allowing transfer of video signals and data to the remote control unit and user-generated commands to the interface apparatus, the interface apparatus comprising means for generating a video formatted signal and transmitting said video formatted signal to the remote control unit by way of the coupling means.

53. Apparatus as claimed in claim 28, further comprising a video recorder and wherein at least one of the monitoring devices comprises a video input device responsive to a video synchronization signal, the interface apparatus comprising means for generating said video synchronization signal, the system further comprising a remote control unit and means for coupling the remote control unit to the interface apparatus, the remote control unit comprising a video display and manual input means connected to a microprocessor, the coupling means allowing transfer of video signals and data to the remote control unit and user-generated commands to the interface apparatus, and the interface apparatus further comprising means for passing video-formatted signals to the remote control unit.

54. Apparatus as claimed in claim 53, wherein the means for passing video formatted signals includes means for combining video signals from the video recorder with graphics supplied by the interface means and supplying the combination to the remote control unit for display.

* * * * *